United States Patent
Hessdoerfer

(10) Patent No.: US 10,008,913 B2
(45) Date of Patent: Jun. 26, 2018

(54) BRUSH-COMMUNICATED DIRECT-CURRENT MOTOR

(71) Applicant: Brose Fahrzeugteile GmbH & Co. Kommanditgesellschaft, Wuerzburg, Wuerzburg (DE)

(72) Inventor: Robert Hessdoerfer, Karlstadt-Stetten (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 406 days.

(21) Appl. No.: 14/890,139

(22) PCT Filed: May 13, 2014

(86) PCT No.: PCT/EP2014/059735
§ 371 (c)(1),
(2) Date: Jan. 20, 2016

(87) PCT Pub. No.: WO2014/184180
PCT Pub. Date: Nov. 20, 2014

(65) Prior Publication Data
US 2016/0164388 A1    Jun. 9, 2016

(30) Foreign Application Priority Data
May 15, 2013    (DE) .......... 10 2013 209 046

(51) Int. Cl.
*H02K 23/02* (2006.01)
*H02K 23/36* (2006.01)
(Continued)

(52) U.S. Cl.
CPC ............. *H02K 23/36* (2013.01); *H02K 3/28* (2013.01); *H02K 15/09* (2013.01); *H02K 23/023* (2013.01); *H02K 23/38* (2013.01)

(58) Field of Classification Search
CPC ............................ H02K 23/023; H02K 23/38
See application file for complete search history.

(56) References Cited

U.S. PATENT DOCUMENTS

| 6,694,599 B1 | 2/2004 | Kershaw et al. |
| 8,941,280 B2 | 1/2015 | Sakon et al. |
| (Continued) | | |

FOREIGN PATENT DOCUMENTS

| DE | 103 61 811 A1 | 7/2005 |
| DE | 10 2008 000 377 A1 | 8/2009 |
| (Continued) | | |

OTHER PUBLICATIONS

International Search Report for Application No. PCT/EP2014/059735, date completed Apr. 24, 2015, dated May 13, 2015 (6 pages).

*Primary Examiner* — Ramon M Barrera
(74) *Attorney, Agent, or Firm* — Lewis Roca Rothgerber Christie LLP

(57) ABSTRACT

A brush-commutated direct-current motor comprises a stator which is fitted with a plurality of field poles, a rotor which can rotate in relation to the stator about a rotation axis and which has a plurality of pole teeth, a plurality of windings, wherein a plurality of windings are arranged on each pole tooth, a commutator which is arranged on the rotor and has a plurality of lamellas, wherein each winding is connected to one of the lamellas by means of a first winding arm and is connected to another of the lamellas by means of a second winding arm, and a plurality of short-circuiting links which each electrically connect two windings to one another and to this end are each arranged on at least two lamellas of the commutator. The plurality of windings of the plurality of pole teeth are formed by a plurality of wire turns.

12 Claims, 16 Drawing Sheets

(51) Int. Cl.
*H02K 23/38* (2006.01)
*H02K 15/09* (2006.01)
*H02K 3/28* (2006.01)

(56) References Cited

U.S. PATENT DOCUMENTS

2007/0152532 A1 7/2007 Roos et al.
2011/0127871 A1 6/2011 Roos
2012/0086297 A1 4/2012 Makino

FOREIGN PATENT DOCUMENTS

| DE | 10 2011 082 543 A1 | 3/2013 |
| JP | 2004-88915 A | 3/2004 |
| JP | 4568307 B2 | 8/2010 |
| WO | WO 2009/072280 A1 | 6/2009 |
| WO | WO 2011/121991 A1 | 10/2011 |

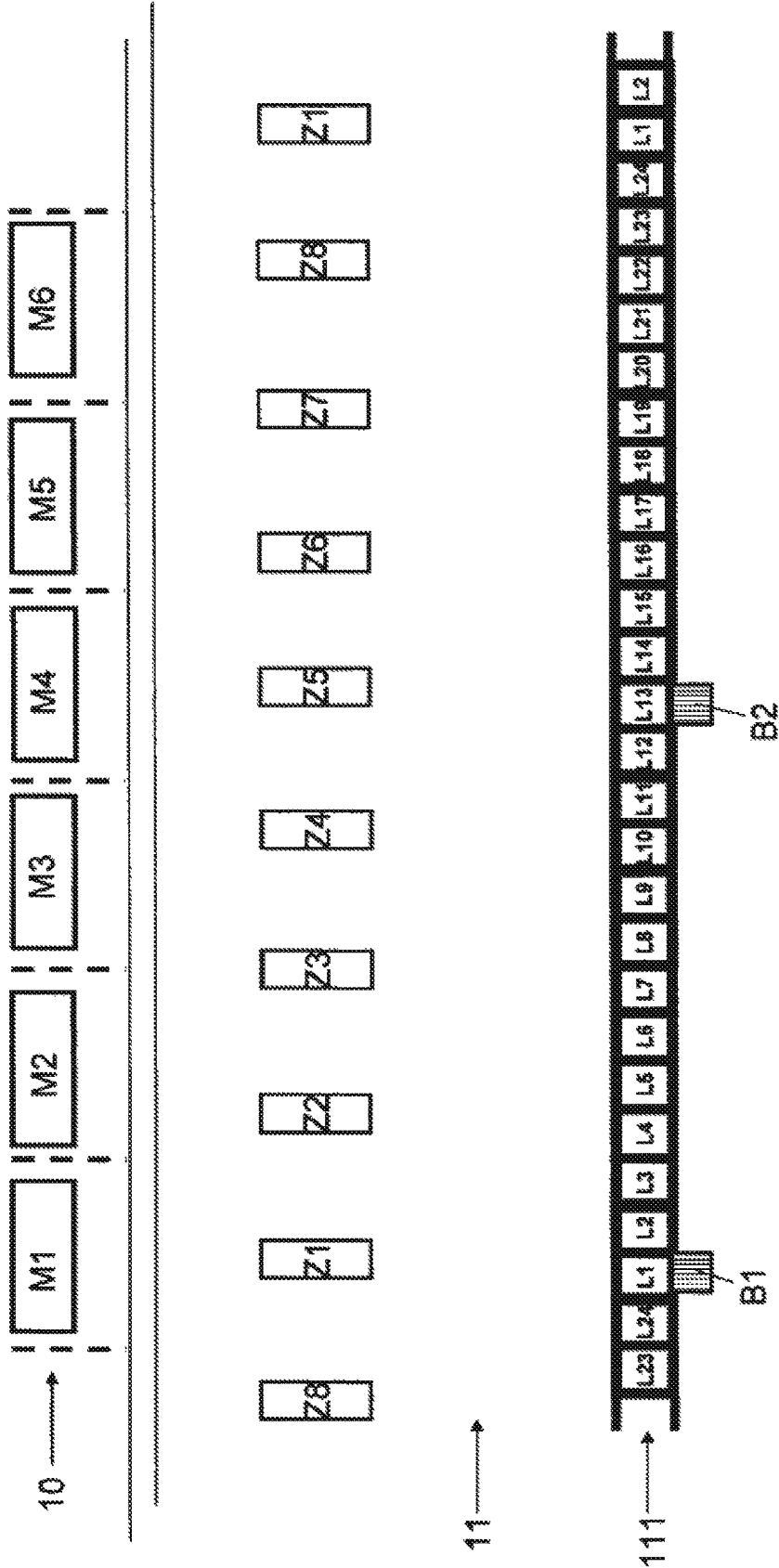

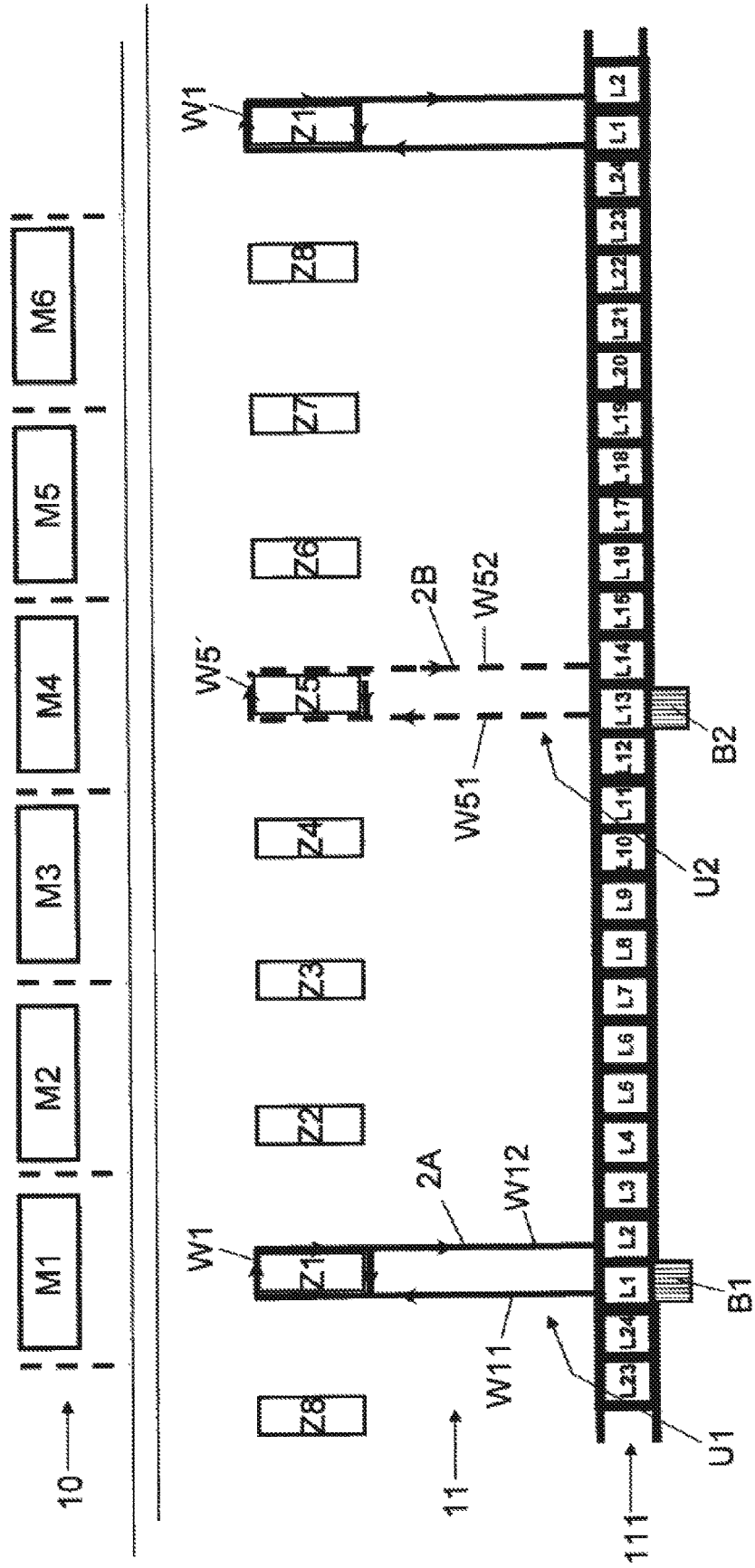

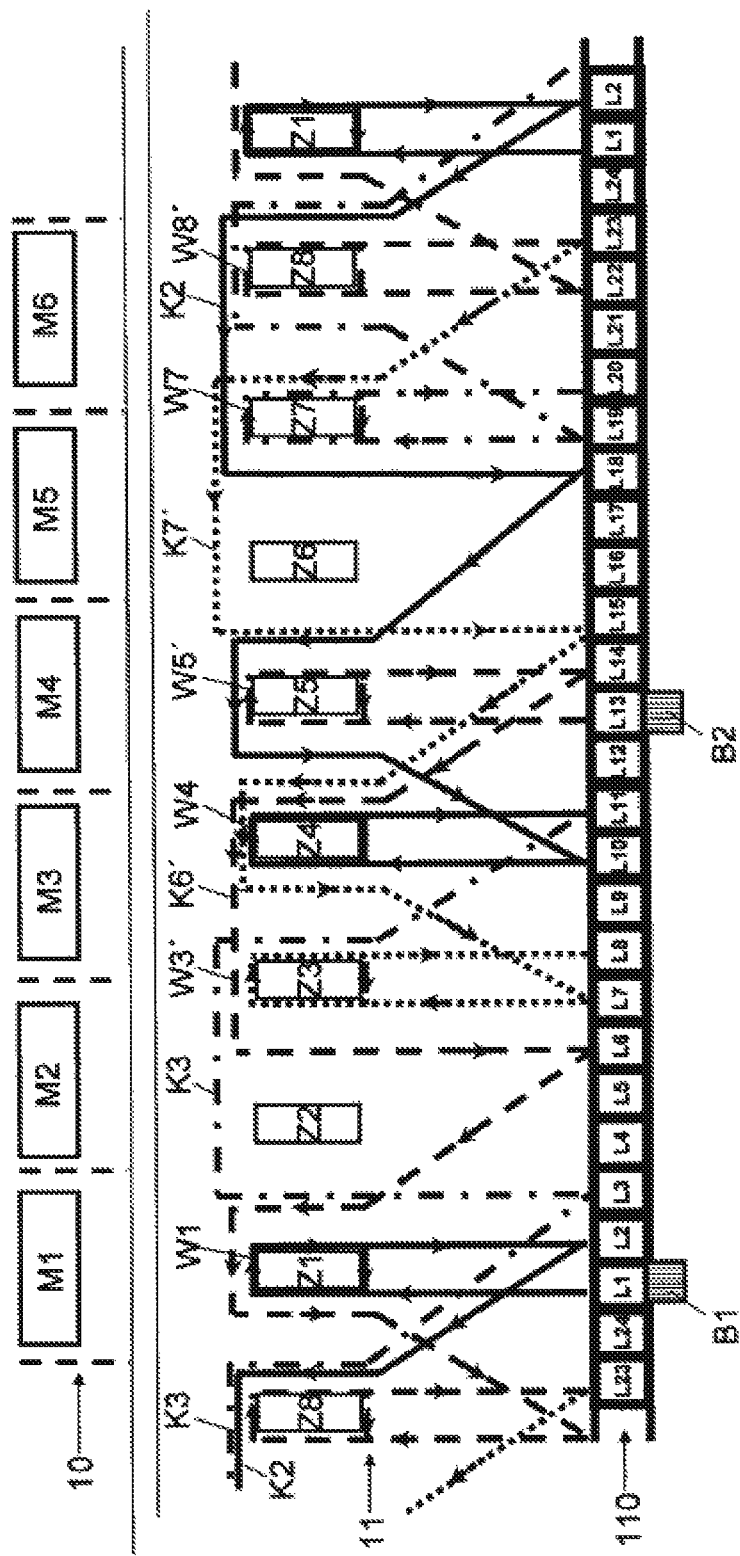

| | |
|---|---|
| L1 | Z1 |
| L2 | Z1/Z8 - Z6/Z7 |
| L18 | Z5/Z6 - Z4/Z5 |
| L10 | Z4 |
| L11 | Z3/Z4 - Z1/Z2 |
| L3 | Z8/Z1 - Z7/Z8 |
| L19 | Z7 |
| L20 | Z6/Z7 - Z4/Z5 |
| L12 | Z3/Z4 - Z2/Z3 |
| L4 | Z2 |
| L5 | Z1/Z2 - Z7/Z8 |
| L21 | Z6/Z7 - Z5/Z6 |
| L13 | Z5 |
| L14 | Z4/Z5 - Z2/Z3 |
| L6 | Z1/Z2 - Z8/Z1 |
| L22 | Z8 |
| L23 | Z7/Z8 - Z5/Z6 |
| L15 | Z4/Z5 - Z3/Z4 |
| L7 | Z3 |
| L8 | Z2/Z3 - Z8/Z1 |
| L24 | Z7/Z8 - Z6/Z7 |
| L16 | Z6 |
| L17 | Z5/Z6 - Z3/Z4 |
| L9 | Z2/Z3 - Z1/Z2 |

| | |
|---|---|
| L1 | |
| L2 | Z1 |
| L18 | Z1/Z8 - Z6/Z7 |
| L10 | Z5/Z6 - Z4/Z5 |
| L11 | Z4 |
| L3 | Z3/Z4 - Z1/Z2 |
| L19 | Z8/Z1 - Z7/Z8 |
| L20 | Z7 |
| L12 | Z6/Z7 - Z4/Z5 |
| L4 | Z3/Z4 - Z2/Z3 |
| L5 | Z2 |
| L8 | Z1/Z2 - Z7/Z8 |
| L21 | Z6/Z7 - Z5/Z6 |
| L13 | Z5 |
| L14 | Z4/Z5 - Z2/Z3 |
| L6 | Z1/Z2 - Z8/Z1 |
| L22 | Z8 |
| L23 | Z7/Z8 - Z5/Z6 |
| L15 | Z4/Z5 - Z3/Z4 |
| L7 | Z3 |
| L8 | Z2/Z3 - Z8/Z1 |
| L24 | Z7/Z8 - Z6/Z7 |
| L16 | Z6 |
| L17 | Z5/Z6 - Z3/Z4 |
| L9 | Z2/Z3 - Z1/Z2 |
| L1 | |

| | | |
|---|---|---|
| | Z1 | L2 |
| | Z1/Z8 - Z6/Z7 | L18 |
| | Z5/Z6 - Z4/Z5 | L10 |
| | Z4 | L11 |
| | Z3/Z4 - Z1/Z2 | L3 |
| | Z8/Z1 - Z7/Z8 | L19 |
| | Z7 | L20 |
| | Z6/Z7 - Z4/Z5 | L12 |
| | Z3/Z4 - Z2/Z3 | L4 |
| | Z2 | L5 |
| | Z1/Z2 - Z7/Z8 | L21 |
| | Z6/Z7 - Z5/Z6 | L13 |
| | Z5 | L14 |
| | Z4/Z5 - Z2/Z3 | L6 |
| | Z1/Z2 - Z8/Z1 | L22 |
| | Z8 | L23 |
| | Z7/Z8 - Z5/Z6 | L15 |
| | Z4/Z5 - Z3/Z4 | L7 |
| | Z3 | L8 |
| | Z2/Z3 - Z8/Z1 | L24 |
| | Z7/Z8 - Z6/Z7 | L16 |
| | Z6 | L17 |
| | Z5/Z6 - Z3/Z4 | L9 |
| | Z2/Z3 - Z1/Z2 | |

| | | |
|---|---|---|
| L1 | Z2/Z3 - Z1/Z2 | L1 |
| L2 | Z1 | L2 |
| L18 | Z1/Z8 - Z6/Z7 | L18 |
| L10 | Z5/Z6 - Z4/Z5 | L10 |
| L11 | Z4 | L11 |
| L3 | Z3/Z4 - Z1/Z2 | L3 |
| L19 | Z8/Z1 - Z7/Z8 | L19 |
| L20 | Z7 | L20 |
| L12 | Z6/Z7 - Z4/Z5 | L12 |
| L4 | Z3/Z4 - Z2/Z3 | L4 |
| L5 | Z2 | L5 |
| L21 | Z1/Z2 - Z7/Z8 | L21 |
| L13 | Z6/Z7 - Z5/Z6 | L13 |
| L14 | Z5 | L14 |
| L6 | Z4/Z5 - Z2/Z3 | L6 |
| L22 | Z1/Z2 - Z8/Z1 | L22 |
| L23 | Z8 | L23 |
| L15 | Z7/Z8 - Z5/Z6 | L15 |
| L7 | Z4/Z5 - Z3/Z4 | L7 |
| L8 | Z3 | L8 |
| L24 | Z2/Z3 - Z8/Z1 | L24 |
| L16 | Z7/Z8 - Z6/Z7 | L16 |
| L17 | Z6 | L17 |
| L9 | Z5/Z6 - Z3/Z4 | L9 |

| | | |
|---|---|---|
| L1 | Z1 | L2 |
| L2 | Z1/Z8 - Z6/Z7 | L18 |
| L18 | Z5/Z6 - Z4/Z5 | L10 |
| L10 | Z4 | L11 |
| L11 | Z3/Z4 - Z1/Z2 | L3 |
| L3 | Z8/Z1 - Z7/Z8 | L19 |
| L19 | Z7 | L20 |
| L20 | Z6/Z7 - Z4/Z5 | L12 |
| L12 | Z3/Z4 - Z2/Z3 | L4 |
| L4 | Z2 | L5 |
| L5 | Z1/Z2 - Z7/Z8 | L21 |
| L21 | Z6/Z7 - Z5/Z6 | L13 |
| L13 | Z5 | L14 |
| L14 | Z4/Z5 - Z2/Z3 | L6 |
| L6 | Z1/Z2 - Z8/Z1 | L22 |
| L22 | Z8 | L23 |
| L23 | Z7/Z8 - Z5/Z6 | L15 |
| L15 | Z4/Z5 - Z3/Z4 | L7 |
| L7 | Z3 | L8 |
| L8 | Z2/Z3 - Z8/Z1 | L24 |
| L24 | Z7/Z8 - Z6/Z7 | L16 |
| L18 | Z6 | L17 |
| L17 | Z5/Z6 - Z3/Z4 | L9 |
| L9 | Z2/Z3 - Z1/Z2 | L1 |

| | | |
|---|---|---|
| L1 | Z1 | L2 |
| L2 | Z1/Z8 - Z6/Z7 | L18 |
| L18 | Z5/Z6 - Z4/Z5 | L10 |
| L10 | Z4 | L11 |
| L11 | Z3/Z4 - Z1/Z2 | L3 |
| L3 | Z8/Z1 - Z7/Z8 | L19 |
| L19 | Z7 | L20 |
| L20 | Z6/Z7 - Z4/Z5 | L12 |
| L12 | Z3/Z4 - Z2/Z3 | L4 |
| L4 | Z2 | L5 |
| L5 | Z1/Z2 - Z7/Z8 | L21 |
| L21 | Z6/Z7 - Z5/Z6 | L13 |
| L13 | Z5 | L14 |
| L14 | Z4/Z5 - Z2/Z3 | L6 |
| L6 | Z1/Z2 - Z8/Z1 | L22 |
| L22 | Z8 | L23 |
| L23 | Z7/Z8 - Z5/Z6 | L15 |
| L15 | Z4/Z5 - Z3/Z4 | L7 |
| L7 | Z3 | L8 |
| L8 | Z2/Z3 - Z8/Z1 | L24 |
| L24 | Z7/Z8 - Z6/Z7 | L16 |
| L16 | Z6 | L17 |
| L17 | | |

↓ U3

2 21

BRUSH-COMMUNICATED DIRECT-CURRENT MOTOR

CROSS-REFERENCE TO A RELATED APPLICATION

This application is a National Phase Patent Application of International Patent Application Number PCT/EP2014/059735, filed on May 13, 2014, which claims priority of German Patent Application Number 10 2013 209 046.3, filed on May 15, 2013.

BACKGROUND

The invention relates to a brush-commutated direct-current motor and also to a method for producing a brush-commutated direct-current motor.

A brush-commutated direct-current motor of this kind, as is known from GE 10 2011 082 543 A1 for example, comprises a stator which is fitted with a plurality of field poles, and a rotor which can rotate in relation to the stator about a rotation axis and which has a plurality of pole teeth. A plurality of windings are arranged on each pole tooth. A commutator which is arranged on the rotor has a plurality of lamellas, wherein each winding is connected to one of the lamellas by means of a first winding arm and is connected to another of the lamellas by means of a second winding arm. In addition, a plurality of short-circuiting links which each electrically connect two windings to one another and to this end are each arranged on at least two lamellas of the commutator are provided. The plurality of windings of the plurality of pole teeth are formed by a plurality of wire turns in this case, wherein each wire turn comprises one winding of each pole tooth and short-circuiting wires which connect the windings and is wound from a continuous wire.

In a direct-current motor, the number of pairs of brushes should usually correspond to half the number of (magnetic) field poles. If a direct-current motor has, for example, six field poles on the stator, three pairs of brushes, that is to say six brushes, are generally intended to be provided, said brushes being in sliding contact with the commutator and supplying current to the windings of the rotor in the desired manner. In this case, the brushes are arranged on the stator in a manner uniformly distributed about the rotation axis and have an alternating electrical polarity, so that a brush with a positive polarity is followed by a brush with a negative polarity and vice versa during operation of the direct-current motor. The brushes with a positive polarity and the brushes with a negative polarity are intended to be electrically connected to one another in this case, this requiring a comparatively large brush holder with a complicated design and circuitry.

For this reason, the direct-current motor which is known from DE 10 2011 082 543 A1 is provided with a plurality of short-circuiting links which are arranged on the rotor and each electrically short-circuit at least two lamellas of the commutator in order to bring individual lamellas to an identical potential. In this way, the number of pairs of brushes required can be reduced, and therefore, despite the use of, for example, six field poles, only one pair of brushes is required, without this having an adverse effect on the operating behavior of the direct-current motor.

Another arrangement of a direct-current motor, in which short-circuiting links for short-circuiting lamellas of a commutator are used, is known from U.S. Pat. No. 6,694,599 E1 in which the short-circuiting links are laid as wires separately between lamellas of the commutator.

JP 2004/088915 A2 discloses a direct-current motor in which the stator has six field poles, the rotor has eight teeth with in each case one winding and the commutator has twenty-four lamellas. In this case, the windings are connected to one another in such a way that they form a closed loop and are connected to one another in series. No short-circuiting links are provided or even required because the number of brushes is six, and therefore corresponds to the number of field poles.

In a brush-commutated direct-current motor which is known from WO 2011/121991 A1, a plurality of windings are provided on a rotor on pole teeth, wherein one winding is arranged on each tooth. In this case, the windings are connected to one another by means of short-circuiting links, wherein the short-circuiting links are laid through slots which are arranged between the pole teeth and said short-circuiting links short-circuit lamellas to which the windings are also connected.

If a plurality of windings are arranged on each pole tooth, as is provided in DE 10 2011 082 543 A1 for example, and the windings are wound in a plurality of wire turns using a single continuous wire or using a plurality of continuous wires, this has the result that each lamella is connected several times to one or more wires and therefore is fitted with at least as many wire connections as there are wire turns. If, for example, three wire turns are provided for arranging three windings on each pole tooth, each lamella is fitted with at least three wire connections which are formed, for example, by the continuous wire of each wire turn being suspended in a hook which is provided on the lamella.

Since each lamella has to be fitted with a plurality of wire connections, a connecting device, for example a hook, of corresponding dimensions which is able to accommodate a corresponding number of wire connections has to be provided on each lamella. This increases the installation space required in the motor, in particular in respect of its axial length, because installation space has to be reserved for the connecting devices.

If the wire turns are each in the form of closed turns in the case of which the turn begins at one lamella and also ends at the same lamella again, at least one lamella has to be fitted with even more wire connections than there are wire turns. When all wire turns are wound from a continuous wire, precisely one lamella to which the wire start and also the wire end are connected is produced, and therefore this lamella has to be fitted with a number of wire connections which corresponds to the number of wire turns plus one. If each wire turn is wound from a single continuous wire, a plurality of lamellas are fitted with a number of wire connections which corresponds to the number of turns plus one.

This further increases the installation space, in particular that which is to be provided in the axial direction.

SUMMARY

An object of the present invention is to provide a brush-commutated direct-current motor and also a method for producing a brush-commutated direct-current motor, in which motor and method the windings and short-circuiting links can be wound from a continuous wire without this excessively increasing the axial installation space requirement.

The object is achieved by a brush-commutated direct-current motor having the features as described herein.

Accordingly, provision is made for a first wire end of the continuous wire to be connected to a first lamella and a second wire end of the continuous wire to be connected to a second lamella which is different from the first lamella.

The present invention proceeds from the idea of at least one of the wire turns by means of which the windings are arranged on the pole teeth of the rotor not being designed as a closed turn. To this end, a first wire end of the continuous wire is connected to a first lamella and a second wire end of the continuous wire is connected to a second lamella which is different from the first lamella, so that the wire is connected to different lamellas at its start and at its end and therefore does not form a closed circumference.

This is possible without changing the electrical properties of the brush-commutated direct-current motor because all short-circuiting wires do not necessarily have to be provided a number of times. If a short-circuiting link is already formed by a wire turn, the short-circuiting link does not have to be duplicated by a further wire turn, but rather can also be omitted. Provided that a short-circuiting link between two windings is implemented by at least one wire turn, said short-circuiting link can be omitted from other wire turns, this making it possible to provide one, several or else all wire turns as non-closed turns in the case of which the wire ends are connected to different lamellas.

This results, in particular, in a first winding, which is adjacent to the first wire end, and a second winding, which is adjacent to the second wire end, not being electrically connected to one another by means of a short-circuiting link, so that an open turn is produced. The wire turn is then electrically closed when the short-circuiting link which is omitted from the wire turn is formed by another wire turn, so that the first winding and the last winding of the wire turn are electrically connected to one another by means of a short-circuiting link of another wire turn.

Since the continuous wire which forms a wire turn is connected to different lamellas by way of its start and its end, not one lamella is occupied by both the wire start and the wire end for this wire turn. This allows the maximum number of wire connections per lamella to be reduced, wherein each lamella is advantageously fitted with a number of wire connections which corresponds precisely to the number of wire turns. If, for example, three wire turns are provided for forming three windings per pole tooth, the number of wire connections per lamella is advantageously three. Since not one or more lamellas has to be fitted with more wire connections than the number of wire turns, no hook from which the continuous wire for electrical connection to the lamellas is suspended has to be of relatively large dimensions, and all hooks can advantageously be of identical design.

The plurality of windings of each pole tooth are preferably connected to the same lamellas. The plurality of windings of each pole tooth are therefore connected so as to have the same electrical effect and are supplied with current in the same way during operation of the direct-current motor, so that a parallel circuit of the windings is produced on each pole tooth. Since a plurality of windings are provided per pole tooth, the windings can all be wound from a relatively thin wire, this allowing the radial installation space in the motor to be reduced. In this case, the provision of a plurality of windings per pole tooth also increases the number of wire connections per lamella but, since not each wire turn is of closed design, it is possible to at least ensure that the number of wire connections per lamella does not exceed the number of wire turns.

Different procedures for winding the wire turns are feasible and possible in principle.

In a first embodiment, each wire turn can be wound from a separate wire. In this case, the wire turns can be wound, for example, in accordance with the multiple flyer winding technique or multiple needle winding technique and can be produced simultaneously by the different wire turns starting from different pole teeth.

In this embodiment, each wire turn can preferably be designed as a non-closed turn in which the wire start and the wire end are attached to different lamellas. A short-circuiting link which is not provided in a wire turn can in this case be formed by a corresponding short-circuiting link of another wire turn. When the wire turns start from different pole teeth, this produces a maximum number of wire turns per lamella, this number corresponding to the number of wire turns.

In another embodiment, all wire turns can also be wound from a single continuous wire, wherein the needle winding technique or the flyer winding technique can be used for this purpose for example. Therefore, only one continuous wire is provided for attaching all windings, wherein at least the last wire turn is not closed since the wire start and the wire end are connected to different lamellas. The short-circuiting link which is not provided in the last wire turn is electrically replaced by a short-circuiting link of a another wire turn in this case, so that the omission of the short-circuiting link in the last wire turn does not have any influence on the electrical operation of the motor.

In an advantageous refinement, the short-circuiting links for short-circuiting two lamellas can each be placed around at least one pole tooth by virtue of in each case extending from one lamella, through a slot between two pole teeth, around at least one pole tooth and through another slot, to another lamella. This proceeds from the idea that the short-circuiting links are intended to be attached to the rotor in such a way that they extend between the slots between the pole teeth and are accordingly laid in the area in which the windings on the pole teeth are also arranged. Firstly, this allows a reduction in installation space because no additional installation space has to be reserved for the short-circuiting links. The short-circuiting links can be laid around one or more pole teeth in a simple manner through the slots in order to connect lamellas to one another such that they are short-circuited. Secondly, this makes it possible to produce the windings and short-circuiting links from a single wire and therefore in a continuous manner, so that the windings and short-circuiting links can be attached to the rotor in a single working step. Separate working steps firstly for attaching the windings and secondly for attaching the short-circuiting links can therefore be dispensed with.

The statement that the short-circuiting links are each placed around at least one pole tooth is intended to be understood to mean that each short-circuiting link engages around at least one pole tooth at least in sections. The short-circuiting links surround the pole tooth or the pole teeth circumferentially through not completely, but rather, for example, starting from a lamella on a front side of the rotor on which the lamellas of the commutator are arranged, are inserted into a slot, run on a rear side of the rotor along one or more pole teeth and are guided back to the front side of the rotor through another slot in order to be connected to another lamella on this front side.

The short-circuiting links are not necessarily intended to be guided through the slots or around a pole tooth. Instead, the short-circuiting links can also be guided through below the commutator.

The number of field poles, which can be formed by permanent magnets on the stator for example, can be six for example, the number of pole teeth can be eight for example, and a total of twenty-four lamellas can be provided on the commutator, wherein other numbers of field poles, pole teeth and lamellas are also feasible and possible in principle.

The windings are preferably in the form of so-called concentrated windings, also called single number windings. This is intended to be understood to mean that the windings each extend only around one pole tooth and therefore are produced by a wire being wound around one pole tooth. The windings can, for example, each have one, two or three or else more windings and be produced from a suitable wire.

The short-circuiting links serve to short-circuit individual lamellas of the commutator in order to in this way reduce the number of pairs of brushes required, ideally to 1. If, for example, the number of field poles is 6, each short-circuiting link advantageously short-circuits three lamellas, so that the three lamellas are at an identical potential when a brush makes contact with one of the lamellas. In this case, the short-circuited lamellas advantageously have an identical angular spacing of 120° in relation to one another in accordance with the equation $$\alpha = 720°/N,$$

where N corresponds to the number of field poles and is a multiple of 2.

If the short-circuiting links each connect precisely three lamellas to one another such that they are short-circuited, the short-circuiting links, starting from a first lamella of the commutator, each advantageously extend around two pole teeth in the direction of a second lamella, and from the second lamella around a further pole tooth to a third lamella. In this way, the short-circuiting links can be laid in a manner which is expedient in respect of the required installation space. In addition, the short-circuiting links do not influence the operating behavior of the direct-current motor, or at least do not influence said operating behavior to a significant extent, by being laid in this way. The background to this is that laying the short-circuiting links which carry current during operation of the direct-current motor around one or more pole teeth produces a magnetic flux in the pole tooth or the pole teeth, it being possible for said magnetic flux to influence the operating behavior of the direct-current motor. This influence can be minimized by special laying of the short-circuiting links around the pole teeth, so that significant effects cannot be noticed in the operating behavior.

The object is also achieved by a method for producing a brush-commutated direct-current motor. In this case, the brush-commutated direct-current motor comprises a stator which is fitted with a plurality of field poles, a rotor which can rotate in relation to the stator about a rotation axis and which has a plurality of pole teeth, and a plurality of windings. A plurality of windings are arranged on each pole tooth. A commutator which is arranged on the rotor and has a plurality of lamellas is provided, wherein each winding is connected to one of the lamellas by means of a first winding arm and is connected to another of the lamellas by means of a second winding arm. A plurality of short-circuiting links each electrically connect two windings to one another and to this end are each arranged on at least two lamellas of the commutator. The plurality of windings of the plurality of pole teeth are formed by a plurality of wire turns in the method, wherein each wire turn comprises one winding of each pole tooth and short-circuiting wires which connect the windings and is wound from a continuous wire. In this case, provision is additionally made for a first wire end of the continuous wire to be connected to a first lamella and a second wire end of the continuous wire to be connected to a second lamella which is different from the first lamella.

In respect of advantages and advantageous refinements, reference is made to the statements made above in relation to the direct-current motor which also equally apply to the method.

BRIEF DESCRIPTION OF THE DRAWINGS

The idea on which the invention is based will be explained in greater detail below with reference to the exemplary embodiments which are illustrated in the figures.

FIGS. 6A-6G show views of the windings and the short-circuiting links arranged on the pole teeth of the rotor.

FIGS. 7A-7C show schematic views of three wire turns of a winding scheme for winding a plurality of windings on a plurality of pole teeth using a continuous wire.

FIGS. 8A-8C show schematic views of three wire turns of a winding scheme for winding a plurality of windings on a plurality of pole teeth using a continuous wire, representing a first exemplary embodiment which embodies the present invention.

FIGS. 9A-9C show schematic views of three wire turns of a winding scheme for winding a plurality of windings on a plurality of pole teeth using a continuous wire, representing a second exemplary embodiment which embodies the present invention.

DETAILED DESCRIPTION

Figure 1:
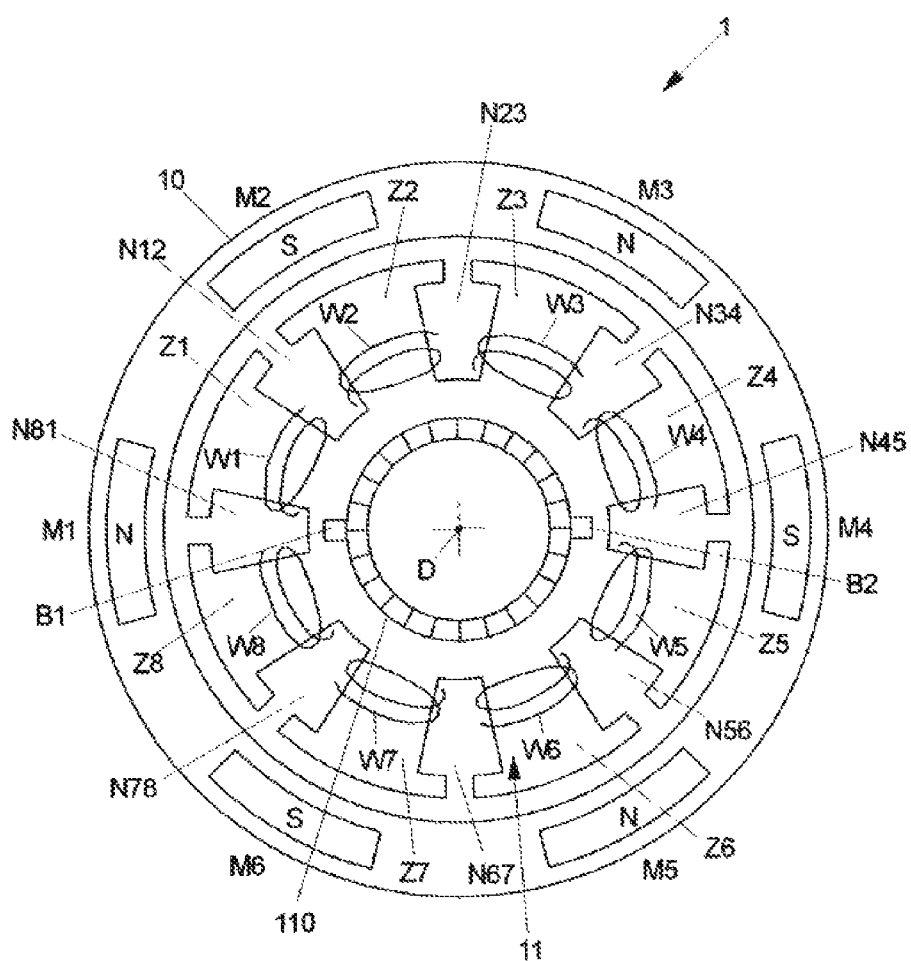
FIG. 1 shows a schematic view of a brush-commutated direct-current motor.

FIG. 1 shows a schematic view of a brush-commutated direct-current motor 1 which has a stator 10 and a rotor 11 which is arranged on the stator 10 such that it can rotate about a rotation axis D.

As is known, the stator 10 has a number of field poles M1-M6 which are formed by permanent magnets and are arranged in a manner uniformly distributed over the circumference of the stator 1. In this case, the field poles M1-M6 point toward the rotor 11 with different poles N, S in such a way that a north pole N is always followed by a south pole S and vice versa.

In the illustrated exemplary embodiment, the stator 10 has precisely six field poles M1-M6.

The rotor 11 is arranged on the stator 10 such that it can rotate about the rotation axis D, and has eight pole teeth Z1-Z8 which point toward the stator 10 from the rotation axis D and are separated from one another in the circumferential direction around the rotation axis D by means of slots N12, N23, N34, N45, N56, N67, N78, N81. The rotor 11 can be designed, for example, in a manner which is known per se, as a lamellad core comprising individual rotor lamellas in which the pole teeth Z1-Z8 are formed.

In the illustrated exemplary embodiment, the rotor 11 has precisely eight pole teeth Z1-Z8.

Each pole tooth Z1-Z8 is fitted with one or more windings W1-W8 which are each wound around the pole teeth Z1-Z8. The windings W1-W8 are each connected to lamellas L1-L24 (see FIG. 2) of a commutator 110 which is fixedly arranged on the rotor 11 and is operatively connected in a sliding manner to brushes B1, B2, which are arranged on the stator 10 in a fixed position, in such a way that current can be supplied to the windings W1-W8 by means of the brushes B1, B2 and the commutator 110 in order to generate an electromotive force (EMF).

The commutator 110 commutates the windings W1-W8, as is also known from DE 10 2011 082 543 A1 for example, the content of this application being incorporated in the present application.

Figure 2:
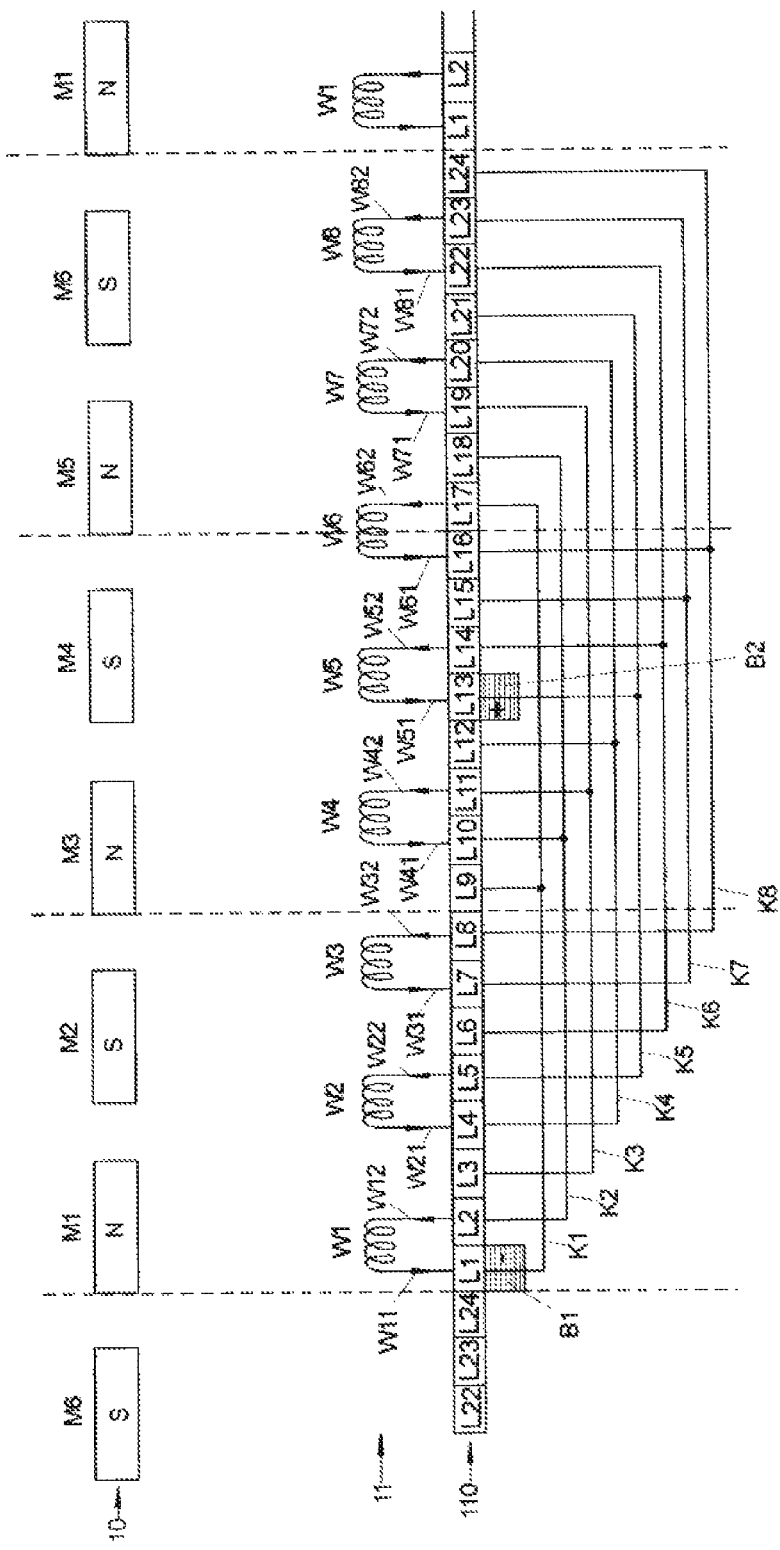
FIG. 2 shows a schematic, unrolled view of the brush-commutated direct-current motor.

FIG. 2 shows a schematic view of the brush-commutated direct-current motor 1, wherein, for the sake of clarity, the brush-commutated direct-current motor 1 is illustrated in unrolled form and accordingly the field poles M1-M6 and the pole teeth Z1-Z8 and the lamellas L1-L24 are not arranged in a circle but rather along a straight line.

As is clear from FIG. 2, each winding W1-W8 is connected to precisely two lamellas L1-L24 of the commutator 110 of the rotor 11, wherein.

the winding W1 is connected to the lamellas L1, L2 by means of winding arms W11, W12,
the winding W2 is connected to the lamellas L4, L5 by means of winding arms W21, W22,
the winding W3 is connected to lamellas L7, L8 by means of winding arms W31, W32,
the winding W4 is connected to lamellas L10, by means of winding arms W41, W42,
the winding W5 is connected to lamellas L13, L14 by means of winding arms W51, W52,
the winding W6 is connected to lamellas L16, L17 by means of winding arms W61, W62,
the winding W7 is connected to lamellas L19, L20 by means of winding arms W71, W72, and
the winding W8 is connected to lamellas L22, L23 by means of winding arms W81, W82.

As will be explained in greater detail below—in this case, each pole tooth Z1-Z8 is fitted with a plurality of windings W1-W8 which are connected electrically in parallel and to this end are each connected to the same lamellas L1-L24. However, only one winding W1-W8 per pole tooth Z1-Z8 is illustrated in FIGS. 1 and 2 for the sake of clarity.

During operation of the direct-current motor 1, current is supplied to the windings W1-W8 by means of the brushes B1, B2, wherein two brushes B1, B2 are provided in the illustrated exemplary embodiment. In order to ensure that lamellas L1-L24 which are offset through 120° in relation to one another are at the same potential and in order to be able to dispense with additional brushes in this case, short-circuiting links K1-K8 are provided which short-circuit to one another in each case three lamellas L1-L24, which are offset in relation to one another through 120° in the circumferential direction around the rotation axis D, and thereby ensure that when one of the brushes B1, B2 makes contact with one of the three lamellas L1-L24, the correspondingly short-circuited lamellas L1-L24 are at the same potential. Accordingly, as is clear from the schematic view, the following lamellas are short-circuited to one another:

L1-L9-L17 (short-circuiting link K1),
L2-L10-L18 (short-circuiting link K2),
L3-L11-L19 (short-circuiting link K3),
L4-L12-L20 (short-circuiting link K4),
L5-L13-L21 (short-circuiting link K5),
L6-L14-L22 (short-circuiting link K6),
L7-L15-L23 (short-circuiting link K7),
L8-L16-L24 (short-circuiting link K8).

If, for example, in one rotor position, the brush B1 bears against the lamella L1 and the brush B2 bears against the lamella L13 and the brush B1 has a negative polarity (−) and the brush B2 has a positive polarity (+), the directions of current flow indicated by arrows on the winding arms W11-W82 are produced.

In principle, it is possible for two, four or six brushes, that is to say one, two or three pairs of brushes, to be used, wherein short-circuiting links K1-K8 ensure uniform current distribution over all brushes.

Figure 3:
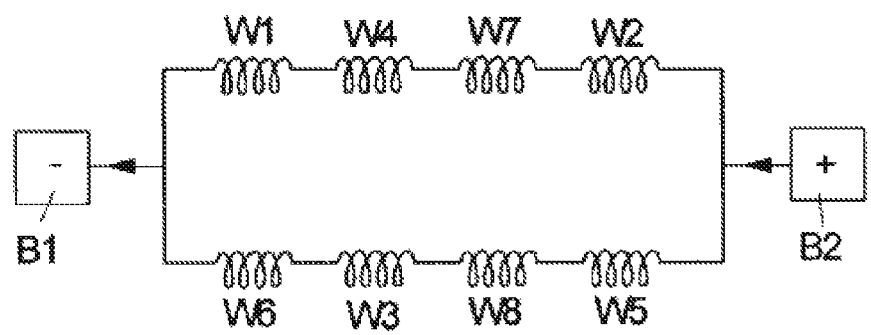
FIG. 3 shows a schematic equivalent diagram of the connection of the windings of the direct-current motor.

Arranging the windings W1-W8 on the lamellas L1-L24 and short-circuiting the lamellas L1-L24 by means of the short-circuiting links K1-K8 results in a series circuit comprising in each case four windings W1-W8 between the brushes B1, B2, it being possible for said series circuit to be illustrated by the schematic equivalent circuit diagram according to FIG. 3 given the rotor position corresponding to FIG. 2. It is clear that two branches with in each case 4 windings W1, W4, W7, W2 and, respectively, W6, W3, W8, W5 are produced between the brushes B1, B2, current correspondingly flowing through said branches when current is supplied by means of the brushes B1, B2.

In the brush-commutated direct-current motor 1, the short-circuiting links K1-K8 are not laid between the lamellas L1-L24 in any desired manner but rather, in order to short-circuit the associated lamellas L1-L24, are each placed around at least one pole tooth Z1-Z8 in such a way that, starting from a lamella L1-L24, they each extend through a slot N12-N81 between two pole teeth Z1-Z8, are placed around at least one pole tooth Z1-Z8 and run through another slot N12-N81 to another lamella L1-L24, and in this way short-circuit the lamellas L1-L24.

Figure 4:
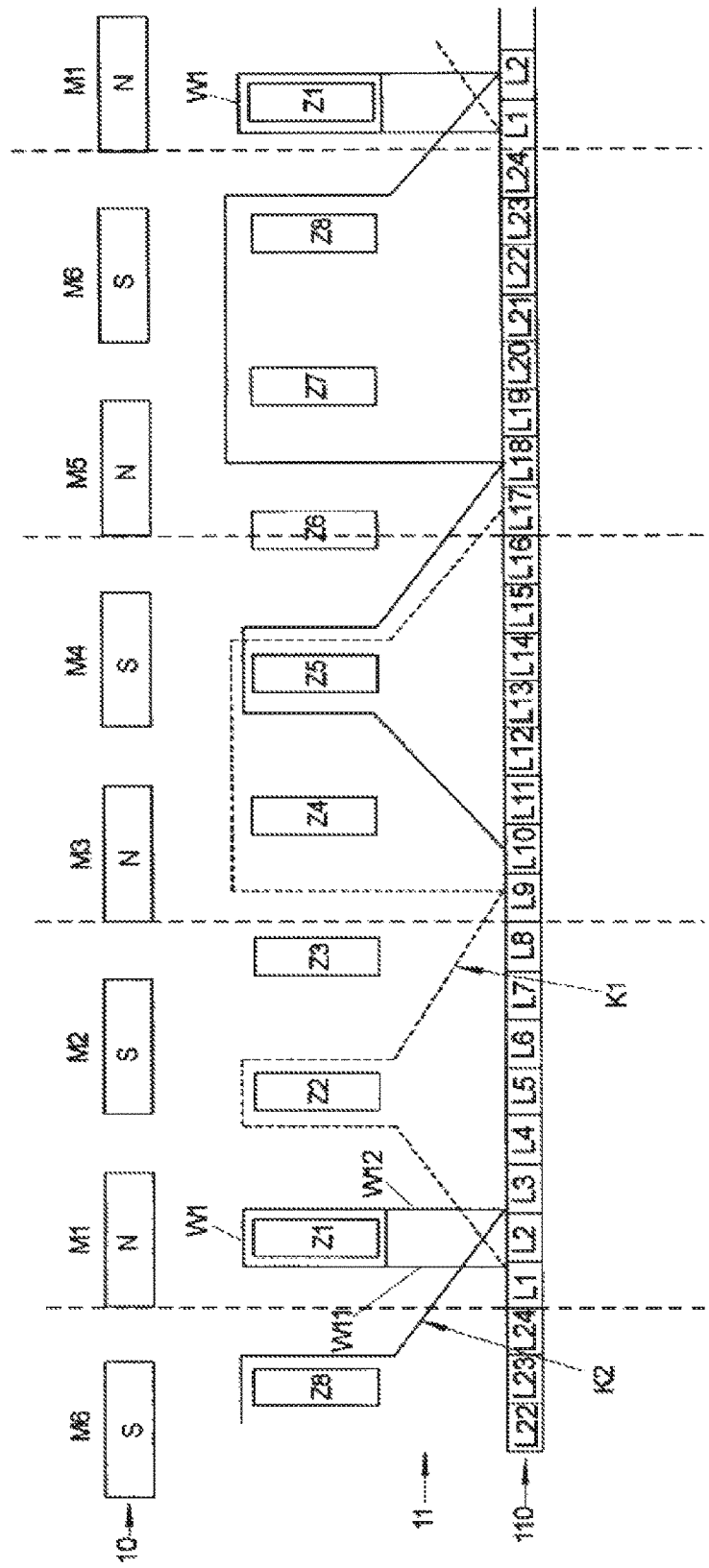
FIG. 4 shows a schematic view of the arrangement of a winding on a pole tooth of a rotor of the direct-current motor and two short-circuiting links which are connected to the winding.

A specific example of laying of the short-circuiting links K1-K8 in this way is illustrated in FIG. 4 on the basis of the short-circuiting links K1, K2 which start from the winding W1. As is clear from FIG. 4, the winding W1 is wound around the pole tooth Z1 and connected to the lamella L1 by a winding arm W11 and connected to the lamella L2 by the other winding arm W12. Starting from the lamella L1, the short-circuiting link K1 extends around the pole tooth Z2 and runs to the lamella L9, extends further around the pole teeth Z4, Z5 from said lamella L9, and is finally connected to the lamella L17, so that the lamellas L1, L9, L17 are electrically short-circuited to one another by means of the short-circuiting link K2, and the lamellas L2, L9, L17 are at the same potential when a brush makes contact with one of the lamellas L1, L9, L17.

The short-circuiting link K2 extends from the lamella L2 of the commutator 110, around the pole teeth Z7, Z8, to the lamella L18, and from said lamella L18, around the pole tooth Z5, to the lamella L10, so that the lamellas L2, L10, L18 are electrically short-circuited to one another by means of the short-circuiting link K2.

In the present case, the statement that the short-circuiting links K1-K8 extend around the pole teeth Z1-Z8 is intended to be understood to mean that, starting from a lamella L1-L24 on an axial front side of the rotor 11 (corresponding to the front side illustrated in FIG. 1 for example), said short-circuiting links extend through a slot N12-N81 to a rear side of the rotor 11, run along one or more pole teeth Z1-Z8 on the rear side, and are returned to the front side through another slot N12-N81, in order to be connected to another lamella L1-L24. Therefore, the short-circuiting links K1-K8 do not describe a complete turn around one or around several pole teeth Z1-Z8, but rather are merely placed around one or around several pole teeth Z1-Z8 as approximate half-turns.

Since the short-circuiting links K1-K8 are placed around the pole teeth Z1-Z8, installation space can be saved because no additional installation space has to be reserved for the short-circuiting links K1-K8.

In addition, it is possible to wind the windings W1-W8 and the short-circuiting links K1-K8 from a single wire, so that firstly additional components for attaching the short-circuit links K1-K8 are not required and secondly attachment of the windings W1-W8 and the short-circuiting links K1-K8 to the rotor 11 can be simplified and can be reduced to a single working step.

FIG. 4 illustrates the laying of the short-circuiting links K1-K8 on the basis of the short-circuiting links K1, K2 which start from the winding W1. Short-circuiting links K1-K8 start from the other windings W2-W8 in an analogous manner, wherein one short-circuiting link K1-K8 is in each case associated with two windings W1-W8 and accordingly eight windings W1-W8 and eight short-circuiting links K1-K8 are provided.

Laying the short-circuiting links K1-K8 in a special manner around two pole teeth Z1-Z8 in sections and around one pole tooth Z1-Z8 in sections (see FIG. 4) can result in the influence of the short-circuiting links K1-K8 on the operating behavior of the direct-current motor 1 being negligibly low. During operation of the direct-current motor 1, current flows through the short-circuiting links K1-K8 and said short-circuiting links accordingly also produce a magnetic flux in the pole teeth Z1-Z8, it being possible however—given the proposed laying—to keep the influence of said magnetic flux low, so that the operating behavior of the direct-current motor 1 is not or at least not appreciably adversely affected by the course of the short-circuiting links K1-K8 around the pole teeth Z1-Z8. However, the short-circuiting links K1-K8 can advantageously even contribute to torque formation.

Figure 5:
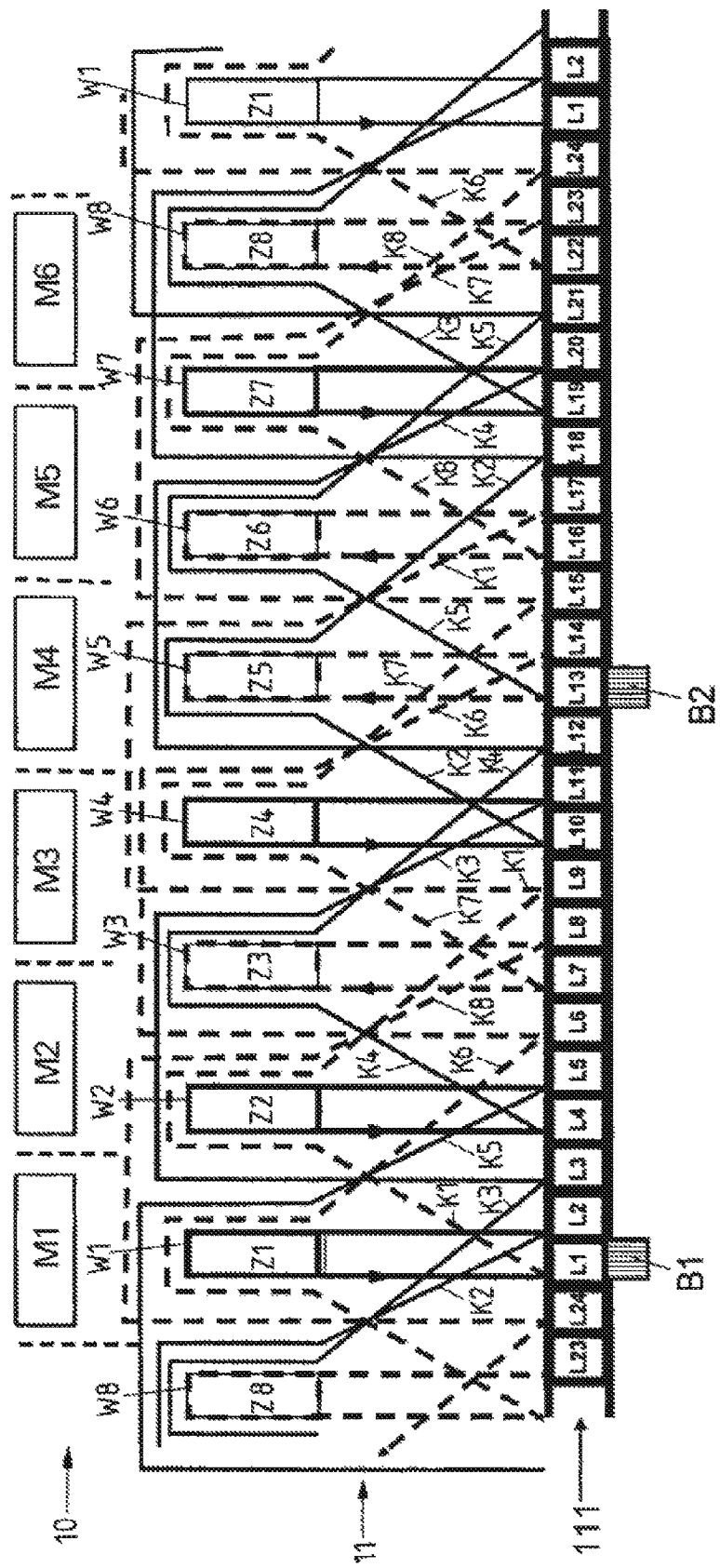
FIG. 5 shows a schematic view of the windings which are arranged on the pole teeth of the rotor.

FIG. 5 schematically shows the rotor 11 with eight windings W1-W8 which are attached to eight pole teeth Z1-Z8 and correspondingly laid short-circuiting links K1-K8.

FIGS. 6A-6G illustrate the production steps for winding the windings W1-W8 and the short-circuiting links K1-K8 onto the pole teeth Z1-Z8 with connection to the lamellas L1-L24, wherein an unrolled illustration of the direct-current motor 1 has again been selected in FIGS. 6A-6G to aid clarity.

In the exemplary embodiment illustrated in FIGS. 6A-6G, two windings W1-W8, W1'-W8' are arranged on each pole tooth Z1-Z8. Attaching a plurality of windings W1-W8, W1'-W8' to each pole tooth Z1-Z8 serves to accelerate production and additionally to provide the option of using relatively thin wire.

Each pole tooth Z1-Z8 is fitted with a first winding W1-W8 and a second winding W1'-W8'. The first windings W1-W8 and the second windings W1'-W8', together with the associated short-circuiting links K1-K8, K1'-K8', are each wound from a continuous wire in a simultaneous manner and therefore in a parallel manner in this case, so that windings W1-W8, W1'-W8' and short-circuiting links K1-K8, K1'-K8' can be wound in a simultaneous manner in a single working step, without subsequent working steps for attaching the short-circuiting links K1-K8, K1'-K8' being required.

FIG. 6A first shows the rotor 11 with its pole teeth Z1-Z8 before the windings W1-W8, W1'-W8' are attached.

As is illustrated in FIG. 6B, a winding W1 is first arranged on the pole tooth Z1 and connected to the lamellas L1, L2 by means of winding arms W11, W12. In this case, the starting point is the lamella L1 to which the wire 2A is fastened, for example by being suspended from a hook, in order to wind the wire 2A, starting from this lamella L1, around the pole tooth Z1 and to guide said wire to the lamella L2.

At the same time, the winding W5' is arranged on the pole tooth Z5 with a further, additional wire 2B and is connected to lamellas L13, L14 by means of winding arms W51, W52, wherein to this end the wire 2B is first connected to the lamella L13 and, starting from this lamella L13, the winding W5' is wound around the pole tooth Z5 and is fastened to the lamella L14 in an electrically contact-making manner.

The wires 2A, 2B are fastened to the lamellas L1-L24, for example, by the wires 2A, 2B being suspended in hooks on the lamellas L1-L24 which, after the winding wires 2A, 2B are laid, are bent over in order to then fix the wires 2A, 2B to the lamellas L1-L24, for example by means of welding (hot-caulking).

Figure 6C:
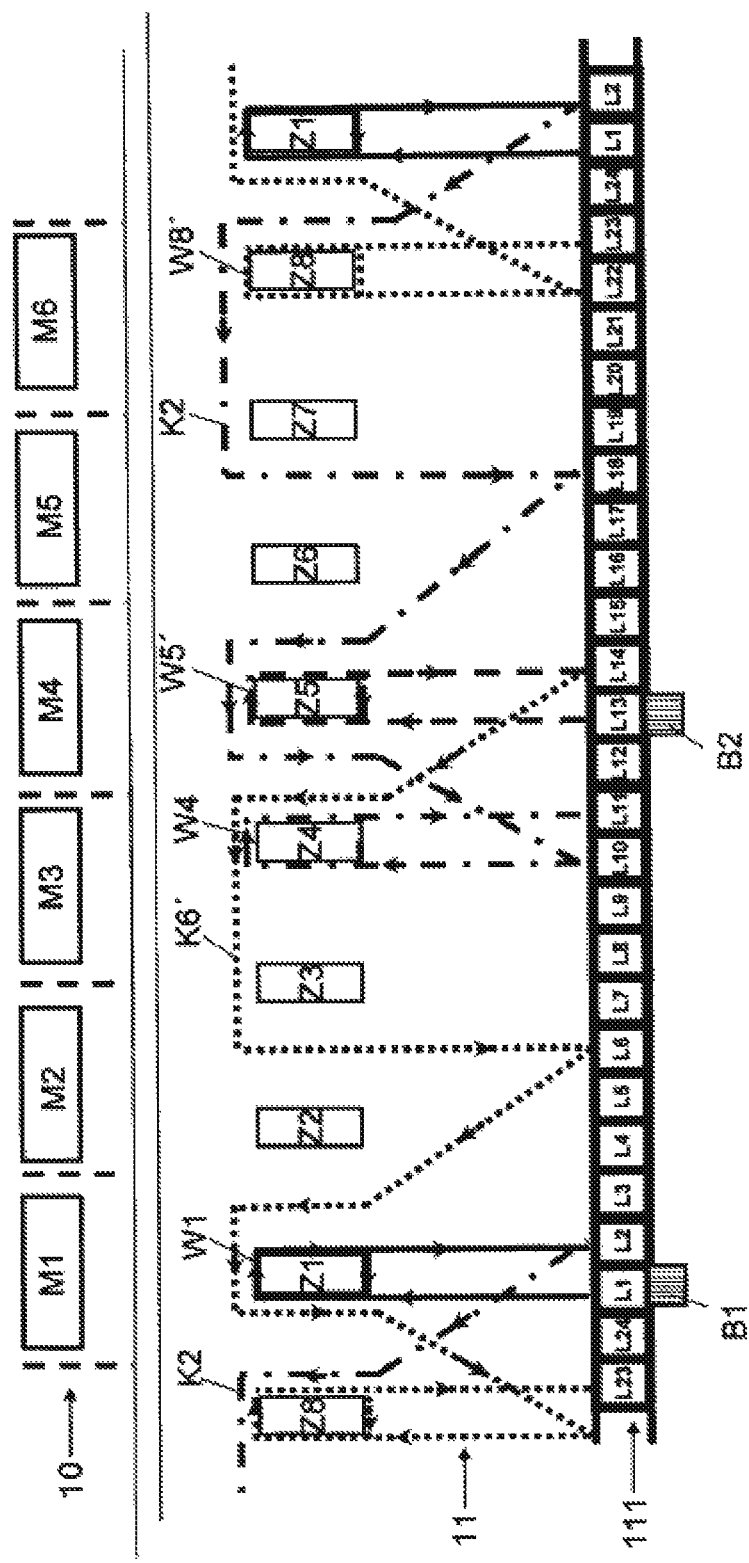

In a next step, as is illustrated in FIG. 6C, short-circuiting links K2, K6' are laid starting from the lamellas L2 (short-circuiting link K2) and L14 (short-circuiting link K6'). In this case, the short-circuiting link K2 extends from the lamella L2, around the pole teeth Z7, Z8, to the lamella L18, and from said lamella L18, around the pole tooth Z5, to the lamella L10. The wire 2A is immediately moved on in order to wind the winding W4 onto the pole tooth Z4 and to connect said winding to the lamella L11. The short-link K6' extends from the lamella L14, around the pole teeth Z3, Z4, to the lamella L6, and from said lamella L6, around the pole tooth Z1, to the lamella L22 at which the wire 2B is moved on in order to wind the winding W8' around the pole tooth Z8 and to connect said winding to the lamella L23.

The winding process is continued in a corresponding manner, wherein, in the next step, as is illustrated in FIG. 6D, the short-circuiting links K3 (starting from the lamella L11) and K7' (starting from the lamella L23) and, adjoining these, the windings W7 (adjoining the short-circuiting link K3) and W3' (adjoining the short-circuiting link K7') are wound.

Figure 6E:
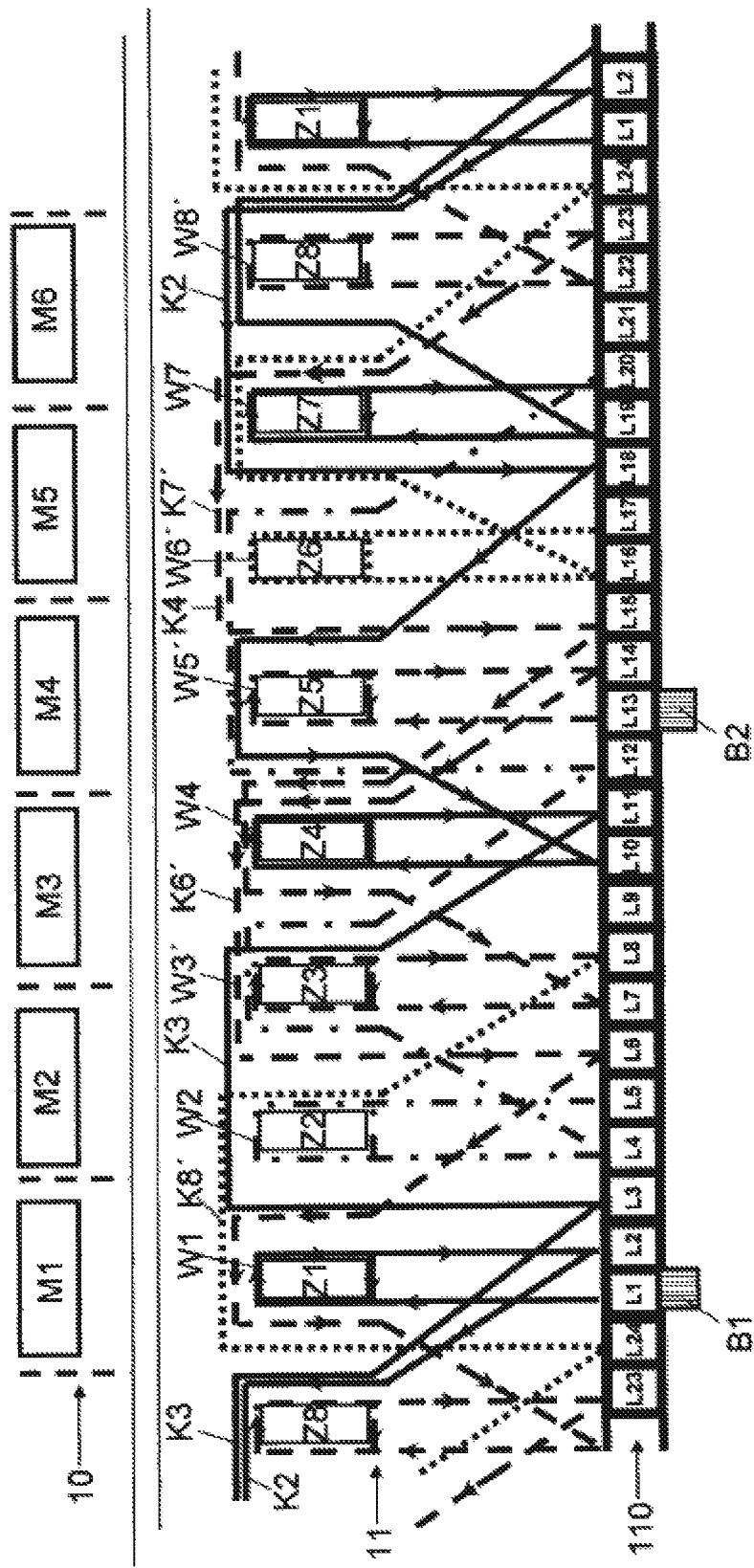

In the next step, as is illustrated in FIG. 6E, the short-circuiting links K4 (starting from the lamella L20) and K8' (starting from the lamella L8) and the windings W2 (adjoining the short-circuiting link K4) and W6' (adjoining the short-circuiting link K8') are wound. In the intermediate state which is illustrated in FIG. 6E, each pole tooth Z1-Z8 is fitted with precisely one winding W1-W8 or W1'-W8'.

Figure 6F:
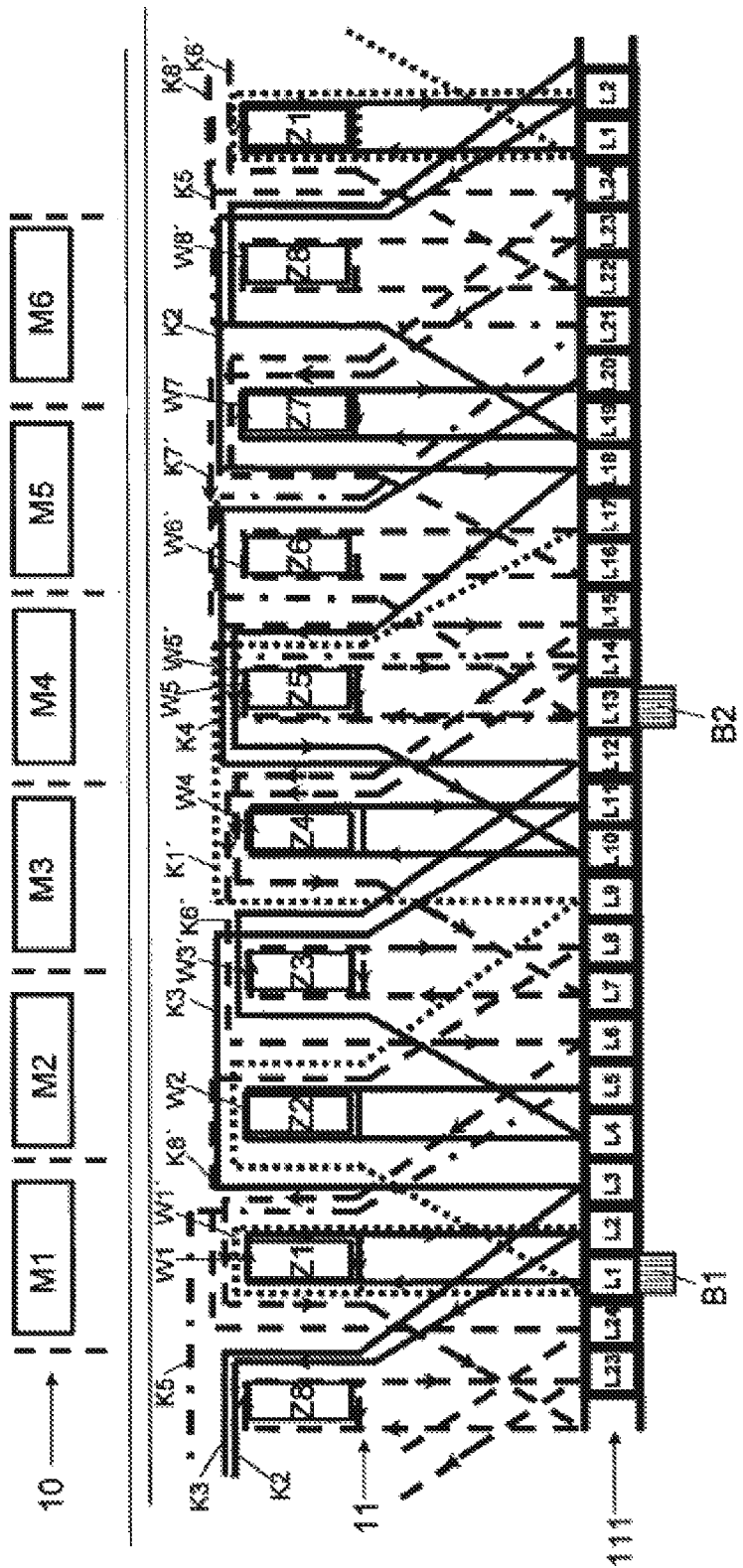
Figure 6G:
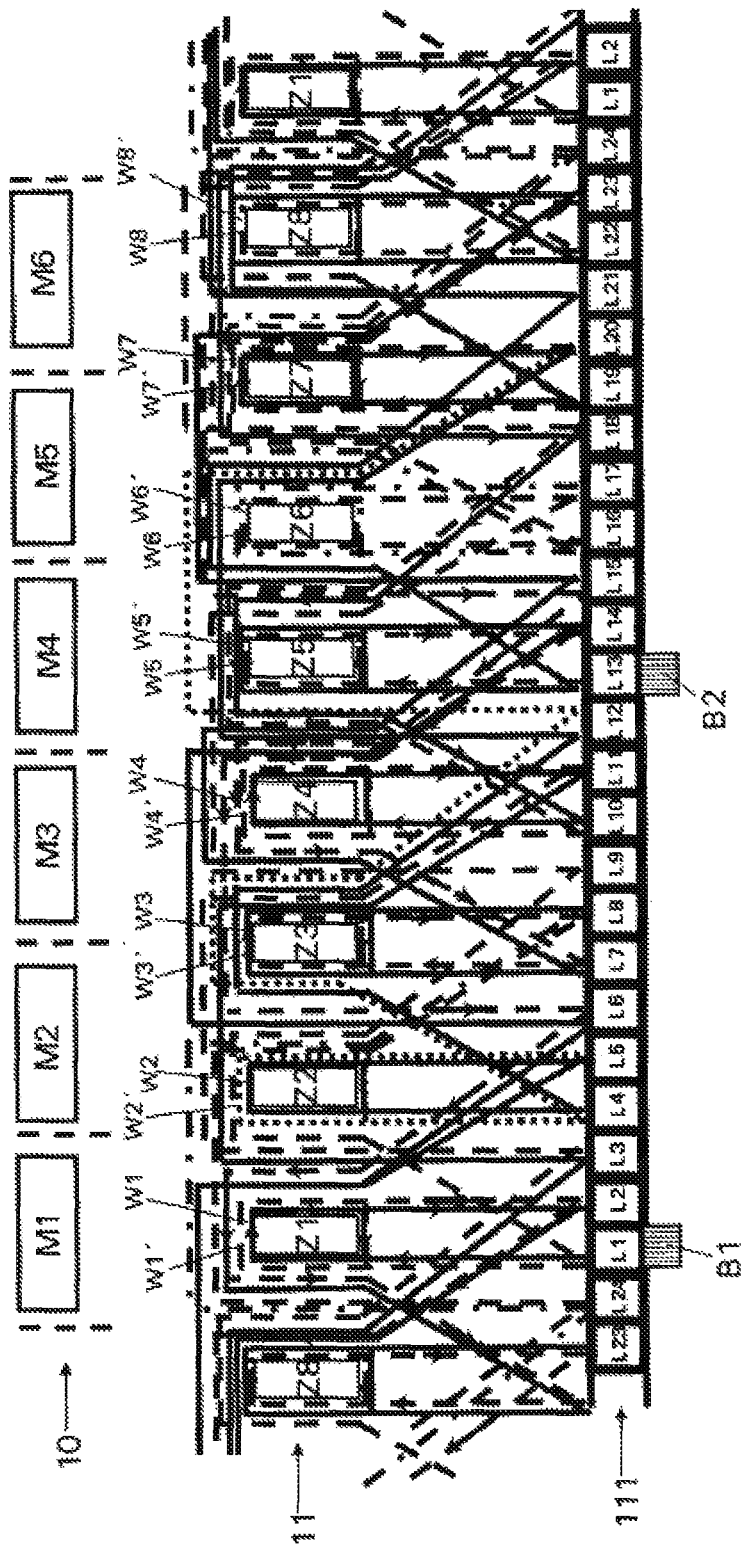

In the next step, as is illustrated in FIG. 6F, the short-circuiting link K5 and the winding W5 as the second winding are wound onto the pole tooth Z5, and the short-circuiting link K1' and the winding W1' as the second winding are wound onto the pole tooth Z1.

As is clear from FIG. 6F, the windings W1, W1' are connected electrically in parallel and are connected to the same lamellas L1, L2. The same applies for the windings W5, W5' on the pole tooth Z5.

If the winding process is continued in an analogous manner to that described above, the end state which is illustrated in FIG. 6G in which each pole tooth Z1-Z8 is fitted with two windings W1-W8, W1'-W8' will ultimately be reached.

For the purposes of the present invention, in the exemplary embodiment according to FIGS. 6A-6G, one or both of the wire turns U1, U2 which form the windings W1-W8 and W1'-W8' and which are each wound from a continuous wire 2A, 2B (see FIG. 6B), is/are not formed as closed turns since, in the first wire turn U1, the last short-circuiting link K1 and, in the second wire turn U2, the last short-circuiting link K5' to be wound are not implemented, or at least not completely implemented, so that the wires 2A, 2B are each not connected to the same lamella L1-L24 by way of their ends. For example, the wires 2A, 2B are connected to the lamella L1 and, respectively, L13 by way of their start (see FIG. 6B) but do not end at said lamella L1 or L13. As a result, said lamella L1, L13 is not occupied by both ends of the wire and accordingly is fitted with only two wire connections, wherein one originates from the end of the wire 2A, 2B and a second originates from the suspension of the other wire turn U2, U1 during winding. Accordingly, the number of wire connections per lamella L1-L24 is equal to the number of wire turns U1, U2, that is to say two.

In electrical terms, the result of the wire turns U1, U2 not being implemented as closed turns is that there is no change in the operating behavior. The last short-circuiting link K1, K5' of the respective wire turn U1, U2 which is not or at least not completely wound is provided completely in the respectively other wire turn U2, U1, so that an electrical connection of the associated lamellas L1, L9 L17 (for the short-circuiting link K1) and L5, L13, L21 (for the short-circuiting link K5') is formed by a corresponding short-circuiting link K1', K5 of the respectively other wire turn U1, U2.

In the exemplary embodiment according to FIGS. 6A-6G, the wire turns U1, U2 are each wound from a continuous wire 2A, 2B, wherein, for example, the flyer winding technique or the needle winding technique can be used for this purpose. This produces two so-called flyers which each form a turn U1, U2.

A further exemplary embodiment is intended to be explained below with reference to FIGS. 7A-7C to FIGS. 9A-9C. In this exemplary embodiment, three wire turns U1-U3 are wound by means of the needle winding technique or flyer winding technique using a single continuous wire 2 in order to form three windings W1-W8 per pole tooth Z1-Z8. In this case, the continuous wire 2 is wound around the pole teeth Z1-Z8 in order to form in each case three windings W1-W8 per pole tooth Z1-Z8, wherein short-circuiting links K1-K8, which connect the windings W1-W8 to one another, are jointly wound and to this end laid through slots N12-N81.

Figures 7A, 7B, 7C:
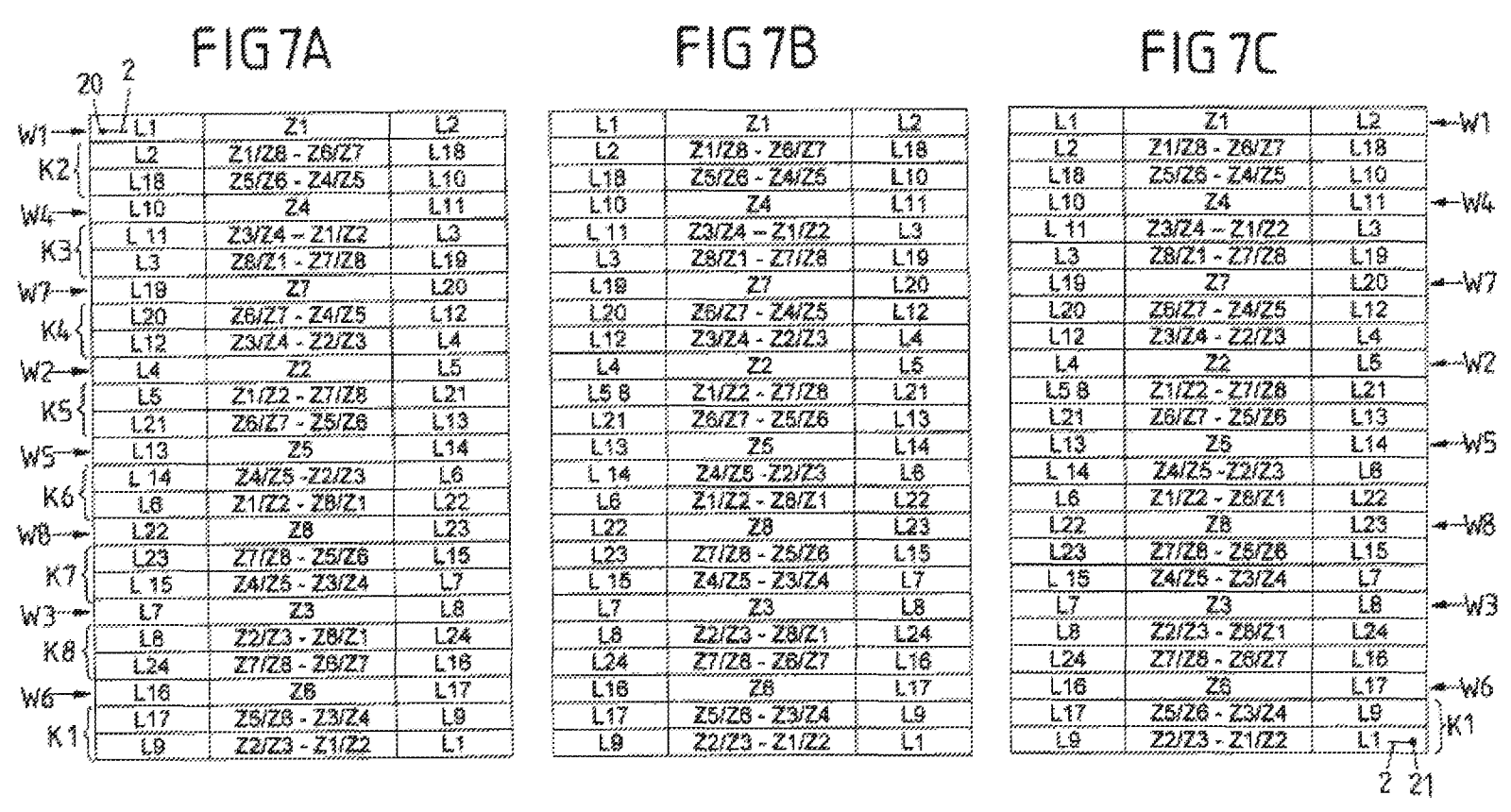

FIGS. 7A-7C first show, in tabular form, a winding scheme in which three turns U1, U2, U3 are wound using a continuous wire 2, and the wire 2 is connected to the first lamella L1 by way of a first wire end 20 and is likewise connected to the first lamella L1 by way of its second wire end 21, so that a closed wire loop is produced. The present invention is accordingly not realized in the exemplary embodiment; the exemplary embodiment inasmuch serves only for illustration purposes.

In the winding scheme, starting from the lamella L1, the first winding W1 is initially wound onto the pole tooth Z1, as is schematically illustrated in FIG. 1. The short-circuiting link K2 is then laid through the slots N81, N67 in order to connect the lamellas L2, L18, L10, in order to then wind the winding W4 onto the pole tooth Z4 (the slots N12-N81 are identified by the adjacent pole teeth in the tabular list according to FIGS. 7A-7C, so that, for example, the slot N12 is identified as "Z1/Z2", the slot N23 is identified as "Z2/Z3" etc.; the slot N81 is identified by "Z1/Z8")

In the winding scheme, the first wire turn U1 is first wound with the windings W1-W8 according to FIG. 7A, wherein the winding W1 is wound first and the winding W6 is wound last. When the short-circuiting link K1 is laid, the first wire turn U1 then returns to the lamella L1, and the second wire turn U1 according to FIG. 7B is then wound in an analogous manner using the same continuous wire 2. After the second wire turn U1 which corresponds to the first wire turn U1 in an identical manner, the third wire turn U3 according to FIG. 7C is then wound, wherein the third wire turn U3 corresponds to the wire turns U1, U2 in an identical manner and therefore again ends on the lamella L1 in the example which does not embody the invention.

In the illustrated example, the wire 2 therefore ends at the same lamella L1 by way of its ends 20, 21, said lamella therefore being occupied a total of four times and therefore being fitted with four wire connections.

In order to avoid this, in the exemplary embodiment according to FIGS. 8A-8C which embodies the invention, the last short-circuiting link K1A of the last wire turn U3 is not completely implemented and therefore does not end at the lamella L1, but rather at the lamella L9. The last section of the short-circuiting link K1 is omitted from the third wire turn U3.

The wire 2 therefore starts from the lamella L1 by way of its first end 20, but does not end at said lamella by way of its second end 21, but rather at the lamella L9 instead. As a result, rather than fourfold occupation, only threefold occupation occurs on the lamella L1. In this way, it is not necessary to dimension the lamella L1 with its hook such that it can be fitted with more wire connections than the number of wire turns U1-U3, but rather the hook of the lamella L1 has to be designed only to accommodate three wire connections, it being possible for this to lead to a reduction in the axial installation space in the direct-current motor 1 in particular.

Since the short-circuiting link K1A is not completely implemented and, in particular, the last section of the short-circuiting link K1 which is to be provided per se has been omitted, the last wire turn U3 is not closed. However, this does not have any electrical influence on the operating behavior because the short-circuiting link K1 is provided completely both in the first wire turn U1 and in the second wire turn U2, and therefore the lamellas L1, L9, L17 are connected to one another by the short-circuiting links K1 of the wire turns U1, U2. The incomplete implementation of the short-circuiting link K1A in the third wire turn U3 therefore does not have any electrical influence on the operating behavior.

In comparison to the winding scheme according to FIGS. 7A-7C, the last section of the short-circuiting link K1 of the third wire turn U3 (see the last two lines according to FIG. 7C) is not completely implemented in the exemplary embodiment according to FIGS. 8A-8C, so that the incomplete short-circuiting link K1A is produced. The incomplete short-circuiting link K1A connects the lamellas L17 and L9 to one another, but not to the further lamella L1, as was implemented in the short-circuiting link K1 which is actually to provided. In another exemplary embodiment according to FIGS. 9A-9C, it is also possible for an incomplete short-circuiting link K1B to be provided at the beginning of the first wire turn U1 instead of the incomplete short-circuiting link K1A at the end of the third wire turn U3. The end 20 of the continuous wire 2 accordingly starts from the lamella L9. In this case, the short-circuiting link K1 is completely omitted from the third wire turn U3. Once again, the wire 2 is connected to different lamellas L9, L17 by way of its ends 20, 21. As a result, the third wire turn U3 is not closed.

Figure 10:
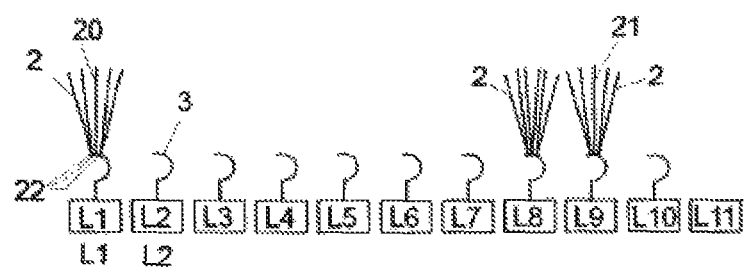
FIG. 10 shows a schematic view of wire connections on individual lamellas of a commutator.

For the purpose of connection to the lamellas L1-24, the wire 2, 2A, 2B is suspended in hooks 3 of the lamellas L1-L24, as is schematically shown in FIG. 10, wherein, after the wire is completely attached, the hook 3 can be bent over and the wire connections 22, which the wire 2 or the wires 2A, 2B form with the hook 3, can be fixed. Since the ends 20, 21 of the wire 2 or of the wires 2A, 2B end at different lamellas L1, L9, precisely as many wire connections 22 as there are wire turns U1-U3 are produced per lamella L1-L24. Accordingly, the hooks 3 are to be dimensioned only to accommodate this number of wire connections 22.

The idea on which the invention is based is not restricted to the exemplary embodiments outlined above, but rather can also be used in entirely different types of embodiments.

In particular, the brush-commutated direct-current motor is not restricted to the numbers of field poles, pole teeth and lamellas specifically indicated here. It is also possible to use a different number of field poles (corresponding to an integer multiple of 2), of pole teeth and of lamellas in principle.

The invention claimed is:

1. A brush-commutated direct-current motor, comprising
   a stator which is fitted with a plurality of field poles,
   a rotor which can rotate in relation to the stator about a rotation axis and which has a plurality of pole teeth,
   a plurality of windings, wherein a plurality of windings are arranged on each pole tooth,
   a commutator which is arranged on the rotor and has a plurality of lamellas, wherein each winding is connected to one of the lamellas by means of a first winding arm and is connected to another of the lamellas by means of a second winding arm, and
   a plurality of short-circuiting links which each electrically connect two windings to one another and to this end are each arranged on at least two lamellas of the commutator,
   wherein the plurality of windings of the plurality of pole teeth are formed by a plurality of wire turns, wherein each wire turn comprises one winding of each pole tooth and short-circuiting wires which connect the windings and is wound from a continuous wire, and
   wherein a first wire end of the continuous wire is connected to a first lamella and a second wire end of the continuous wire is connected to a second lamella which is different from the first lamella.

2. The direct-current motor as claimed in claim 1, wherein a first winding, which adjoins the first wire end, and a second winding, which adjoins the second wire end, are not electrically connected to one another by means of a short-circuiting link.

3. The direct-current motor as claimed in claim 1, wherein each lamella is connected to one or more continuous wires by means of a plurality of wire connections, wherein the number of wire connections per lamella is equal to the number of wire turns.

4. The direct-current motor as claimed in claim 1, wherein the plurality of windings of each pole tooth are connected to the same lamellas.

5. The direct-current motor as claimed in claim 1, wherein each wire turn is wound from a separate wire.

6. The direct-current motor as claimed in claim 5, wherein the wire turns are wound using the flyer winding technique or the needle winding technique.

7. The direct-current motor as claimed in claim 1, wherein the wire turns are wound from a single continuous wire.

8. The direct-current motor as claimed in claim 7, wherein the wire turns are wound using the needle winding technique or the flyer winding technique.

9. The direct-current motor as claimed in claim 1, wherein each pole tooth is bounded along a circumferential direction around the rotation axis by two slots which separate the pole tooth from adjacent pole teeth, wherein the short-circuiting links for short-circuiting two lamellas are each placed around at least one pole tooth by virtue of in each case extending from one lamella, through a slot between two pole teeth, around at least one pole tooth and through another slot, to another lamella.

10. The brush-commutated direct-current motor as claimed in claim 1, wherein the short-circuiting links each short-circuit precisely three lamellas.

11. The brush-commutated direct-current motor as claimed in claim 10, wherein the short-circuiting links are each placed, starting from a first lamella, around two pole teeth in the direction of a second lamella, and from the second lamella around a pole tooth to a third lamella.

12. A method for producing a brush-commutated direct-current motor which comprises
   a stator which is fitted with a plurality of field poles,
   a rotor which can rotate in relation to the stator about a rotation axis and which has a plurality of pole teeth,
   a plurality of windings, wherein a plurality of windings are arranged on each pole tooth,
   a commutator which is arranged on the rotor and has a plurality of lamellas, wherein each winding is connected to one of the lamellas by means of a first winding arm and is connected to another of the lamellas by means of a second winding arm, and
   a plurality of short-circuiting links which each electrically connect two windings to one another and to this end are each arranged on at least two lamellas of the commutator,
   and in which the plurality of windings of the plurality of pole teeth are formed by a plurality of wire turns, wherein each wire turn comprises one winding of each pole tooth and short-circuiting wires which connect the windings and is wound from a continuous wire,
   wherein a first wire end of the continuous wire is connected to a first lamella and a second wire end of the continuous wire (is connected to a second lamella which is different from the first lamella.

* * * * *

UNITED STATES PATENT AND TRADEMARK OFFICE
CERTIFICATE OF CORRECTION

PATENT NO. : 10,008,913 B2
APPLICATION NO. : 14/890139
DATED : June 26, 2018
INVENTOR(S) : Robert Hessdoerfer Page 1 of 1

It is certified that error appears in the above-identified patent and that said Letters Patent is hereby corrected as shown below:

On the Title Page

Item (54) and in the Specification, Column 1, Line 1, Title:
Delete "BRUSH-COMMUNICATED DIRECT-CURRENT MOTOR",
Insert --BRUSH-COMMUTATED DIRECT-CURRENT MOTOR--

Signed and Sealed this
Second Day of October, 2018

Andrei Iancu
*Director of the United States Patent and Trademark Office*